INVENTORS
JACK SANTORI
STANLEY R. ATKINSON
BY Harvey J. Lambert
ATTORNEY 3,308,960
Patented Mar. 14, 1967

3,308,960

RECORD STORAGE RACK

Jack Santori, San Carlos, Calif. (1172 Brucito Ave., Los Altos, Calif. 94022), and Stanley R. Atkinson, 1084 Golden Way, Los Altos, Calif. 94022

Filed Mar. 11, 1966, Ser. No. 533,656
6 Claims. (Cl. 211—40)

This invention relates in general to record holders, and relates more particularly to such holders which permit easy removal, insertion and inspection of the records therein.

The problem of the storage of phonograph records has become of increasing interest as the use of phonograph records in the home increases, primarily due to the widespread popularity of home high fidelity sound reproduction equipment. Storage for records should provide a compact and attractive appearance, while permitting convenient examination of the different records for selection and easy removal and insertion of selected records. Additionally, most modern phonograph records are housed in record jackets which in themselves are quite artistically designed and which, if attractively stored, may add a great deal of color and interest to a room.

There has been a variety of different structures proposed for such record storage, including a rack provided with a plurality of closely spaced dividers which serve to separate the individual record jackets. Such a device does provide for very compact storage, since the records are closely adjacent each other, but it has the distinct disadvantage that only the jackets of the end records are readily visible, thus making record selection difficult and not utilizing the aesthetic properties of the hidden record jackets.

Another approach is that described in U.S. Patent 3,100,671, in which the record jackets are inserted in vertically disposed frame members which are individually pivotable through a horizontal plane. Each frame member is pivotally supported at two points (the top and the bottom) at the back of the frame member so that the frame member and record jacket may be swung about these pivot points to examine the record jacket in record selection. The frame member comprises solid portions on the bottom and back thereof, while the front and top portions extend only partially along their associated sides. Further, the top portion is hinged so that it can be raised to permit insertion and removal of the record jacket from the frame member.

The above described structure does provide for relatively convenient record storage and access, since it permits swivelling of the individual frame members for examination of the jackets therein. However, it does require the use of two pivot members or pins for each frame member, thereby increasing the cost of manufacture of the device. The device also has the requirement that the record jackets be inserted and removed only from the top of the frame member, which necessitates that both the record jacket and the record stored therein be removed and inserted together, rather than permitting the record to be withdrawn from and inserted into the jacket after the record selection has been made.

In accordance with the present invention, there is provided a novel record storage device employing a plurality of vertically disposed record jacket holders which are mounted on a common frame and which are each pivotable about a single pivot point on the frame. In the preferred embodiment of the invention the single pivot point is located at the back of each holder, while the fronts of all of the holders are supported by a common support bar forming part of the frame member. Each holder preferably has a generally L-shaped configuration, the bottom of the holder corresponding to the leg of the L and the back of the holder forming the vertical or upright portion. The holder has a U-shaped cross section forming a record-receiving channel having a width sufficient to permit the insertion of two record jackets. The front end of the bottom portion of the holder is open so that the record jacket may be inserted and removed horizontally. This, in turn, permits a record to be withdrawn from a jacket horizontally without requiring removal of the jacket from the holder.

It is therefore an object of this invention to provide an improved device for storing phonograph records employing record holders which are pivotally mounted for ease of examination and selection of the records stored therein.

It is a further object of this invention to provide a device for storing phonograph records and their jackets employing a plurality of vertically disposed record holders each capable of holding at least two record jackets, each such holder being pivotally mounted at a single pivot point on a common frame member.

It is an additional object of this invention to provide a device for storing phonograph records and their jackets employing a plurality of vertically disposed record holders which are individually pivotable about a single point on a common frame member, each such holder having a U-shaped channel member which is substantially horizontally disposed to support the jackets, the channel member being open at one end thereof to permit insertion and removal of the records from the jackets in a horizontal direction.

It is a further object of the present invention to provide a device for storing phonograph records and their jackets employing a plurality of vertically disposed record holders, each of which is individually pivotable at one end thereof about a single point on a common frame member, the other ends of all of the record holders being supported by a common support bar.

Objects and advantages other than those set forth above will be apparent from the following description when read in connection with the accompanying drawing, in which.

Figures 1, 2, 3, 4:
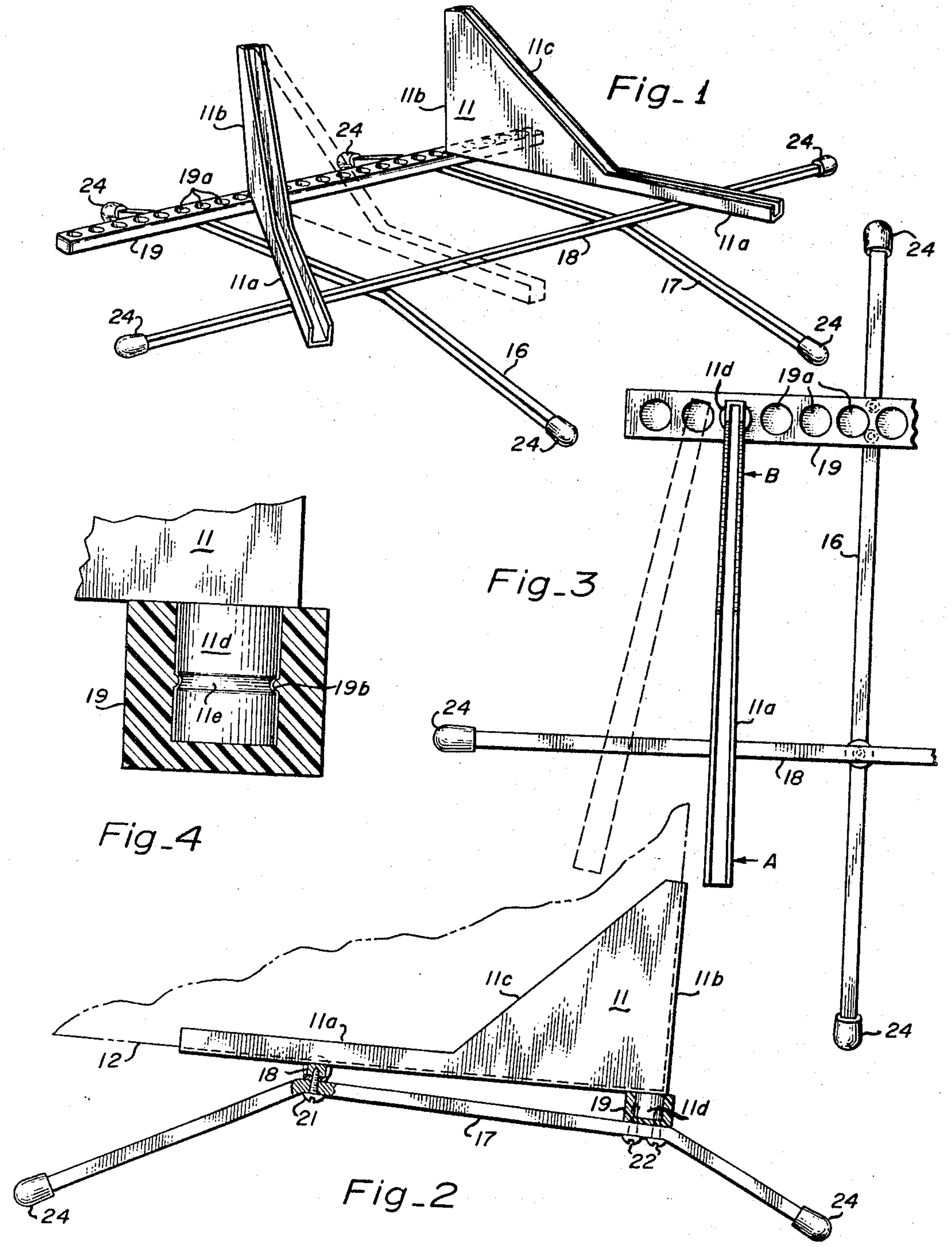
FIGURE 1 is a perspective view of the preferred embodiment of this invention.
FIGURE 2 is an end view of the embodiment of FIGURE 1, showing the details of the pivot means carried by each record holder.
FIGURE 3 is a plan view, on an enlarged scale, of a portion of the device shown in FIGURE 1, illustrating the pivot support means of the frame member.
FIGURE 4 illustrates an alternate embodiment of the pivot means and pivot support means in which the pivot means is releasably locked in the pivot support means.

Referring to the drawing, reference numeral 11 designates generally the record holder of this invention. Holder 11, when viewed from the side, is generally L-shaped and has a bottom portion **11*a* and an upright leg portion 11*b*, these portions being joined by a gusset-like portion 11*c*. In practice, holder 11 is preferably made of unitary construction, and may be formed by any suitable technique such as injection molding of a suitable plastic material. Holder 11 is also provided with pivot means which may be in the form of a protrusion or stud 11*d*** extending downwardly from the bottom rear of the holder (FIGURE 2). This protrusion or stud is preferably a unitary part of the holder and may be formed at the time of molding the holder.

Holder 11 has a U-shaped cross-sectional shape forming a record-receiving channel which will accommodate at least two records and record jackets 12 (shown in dotted outline in FIGURE 2) in side-by-side relationship. As best seen in FIGURE 3, the width of the channel preferably decreases from the front to the back of the holder.

That is, the width of the channel at the point A in FIGURE 3 is slightly greater than the channel width at the point B, and the channel width tapers uniformly from the front to the back. This taper provides a slight wedging action of the record jackets near the rear of the holder adjacent point B to provide firm support for the jackets, while the slightly greater width at the front of the holder adjacent point A permits easy separation of the two jackets to facilitate removal of a record or records from the jackets after selection. It will be understood that the wedging action discussed above is only sufficient to provide firm support for the jackets and does not produce any binding of the records within their jackets so as to make their removal or insertion difficult.

The record holders 11 are mounted for pivotal movement on a frame member which includes a pair of leg members 16, 17, a front support bar 18, and a pivot support member or base 19. Front support bar 18 may be secured to legs 16, 17 by means of screws 21 (FIGURE 2), and pivot support base 19 may be secured to these leg members by screws 22. The ends of leg members 16, 17 and front support bar 18 may be provided with tips 24 of a suitable material such as rubber to provide improved frictional engagement with the support surface and/or prevent marring of surfaces by the ends of the members.

Pivot support member 19 is provided with a plurality of openings **19*a* therein which are adapted to receive the studs 11*d* of record holders 11 to provide pivotal support for each of these holders about a single pivot point. In the preferred form of the invention, each of openings 19*a* is just slightly larger than the diameter of the studs 11*d* on holders 11, permitting easy insertion of the stud in the opening without the use of pressure or any locking means and at the same time resulting in firm support for the stud in the opening. In practice, pivot support member 19 may be formed my injection molding with openings 19*a*** provided therein.

Thus, each of record holders 11 is pivotally supported about a single point at the rear thereof by the engagement of stud **11*d* with an opening 19*a*. The front ends of all of the holders 11 are supported in common by front support bar 18, and the holders are free to slide along this support bar as they are pivoted about their pivot point. As best seen in FIGURE 2, legs 16, 17 have a slight downward slope from front to back and thus impart a similar slope to record holders 11**. This rearward slope of the record holders insures retention of the stored record jackets therein.

In the use of the device, it will be clear that with record jackets placed in holders 11, the jackets may be easily examined by pivoting each of the holders about its pivot point to swing it to a position which will permit an unobstructed view of the jackets in that holder. In this connection, it will be seen from FIGURE 2 that the design of the holder of this invention results in a minimum of obstruction of the record jacket, thus facilitating examination of the jacket contents.

After selection of the desired record or records, they may be easily removed from their jackets by pulling them forward in a horizontal direction. In this connection, it will be a recalled that the slight taper of the channel in holder 11 results in easy removal of the records while insuring firm support for the records and jackets within the holder. After use, the records may be easily inserted back into their associated jackets without having to remove the jacket from the holder, the selection of the proper jacket being aided by the pivotal movement of the individual holders which permits ready inspection of the jacket cover.

From the above, it will be seen that the present invention provides a record storage device which permits ready examination of the individual records and record jackets stored therein, and easy removal and insertion of a selected record from its jacket. It will be further apparent that the device of the present invention is economical to manufacture, is attractive in itself, and results in attractive storage of records. An additional advantage of the construction of this invention is the ease of replacing record holders in the event of loss or damage thereto. Replacement holders may be obtained and easily mounted on the device merely by inserting the stud **11*d* in the appropriate opening 19*a***.

In the embodiment shown and described in FIGURES 1–3, stud or pivot **11*d* fits into opening 19*a* without the use of pressure or any locking means. However, if it is desired to have the record holders locked into base member 19, the embodiment shown in FIGURE 4 may be employed. As shown there, stud 11*d* may be provided with an annular groove 11*e* which is adapted to engage an inwardly projecting ring 19*b* in opening 19*a* of base member 19. By pressing stud 11*d* into opening 19*a* until ring 19*b* engages groove 11*e***, the stud and record holder are locked into the opening while the holder is still free to pivot about this opening in a manner similar to that described above.

While the above detailed description has shown, described and pointed out the fundamental novel features of the invention as applied to various embodiments, it will be understood that various omissions and substitutions and changes in the form and details of the device illustrated may be made by those skilled in the art, without departing from the spirit of the invention. It is the intention, therefore, to be limited only as indicated by the scope of the following claims.

What is claimed is:

1. A device for storing records and their associated record jackets comprising:

a plurality of vertically disposed record holders, each said holder having a generally L-shaped configuration including a bottom portion forming the base of the L and a back portion connected thereto forming the upright of the L;

said bottom portion and said back portion having a U-shaped cross section defining a record jacket-receiving channel in which at least two record jackets may be placed in side-by-side relation;

a frame member including only a pivot support member, a longer front support bar and a pair of leg members, said front support bar being secured to said pivot support member only by said pair of leg members; and means for pivotally supporting each said holder on said pivot support member about a single point at the rear of said bottom portion to permit pivoting of each of said holders in a substantially horizontal plane for examination of the record jackets contained therein;

said pivot support member supporting said holder only at said single point on said bottom portion;

said front support bar bearing against the front of said bottom portion of each of said holders for continuously supporting said holders.

2. Apparatus in accordance with claim 1 in which the width of said channel decreases from the front to the rear of said holder.

3. Apparatus in accordance with claim 1 in which said holder is disposed at a slight angle to the horizontal so that said bottom portion slopes downwardly from front to rear to retain the record jackets in said holder.

4. Apparatus in accordance with claim 1 in which said U-shaped channel in said bottom portion is open at the front thereof to permit insertion and removal of the records from the record jackets horizontally without removing the jackets from said holders.

5. Apparatus in accordance with claim 1 in which said pivot support member includes a base member having a plurality of spaced openings therein, each of said holders having a stud extending downwardly from the rear of said bottom portion engaging one of said openings.

6. A device for storing records and their associated record jackets, comprising:

a plurality of vertically disposed record holders, each said holder having a generally L-shaped configuration including a bottom portion forming the base of the L and a back portion connected thereto forming the upright of the L; each said holder having a downwardly extending pivot at the rear of said bottom portion;

said bottom portion and said back portion having a U-shaped cross section defining a record jacket-receiving channel in which at least two such jackets may be placed in side-by-side relation;

a frame member for supporting said holders, said frame member including only a pair of leg members, and a pivot support member and a longer front support bar secured to said pivot support member only by said pair of leg members;

said pivot support member having a plurality of spaced openings therein into which said pivots may be placed to pivotally support each of said holders at a single point for movement in a substantially horizontal plane; and said front support bar supporting all of said holders near the front of said bottom portion.

References Cited by the Examiner

UNITED STATES PATENTS

| | | | |
|---|---|---|---|
| 1,421,391 | 7/1922 | Bower | 211—40 |
| 2,150,397 | 3/1939 | Owen | 108—8 |
| 2,690,843 | 10/1954 | Ament | 211—40 |
| 3,017,999 | 1/1962 | Cano | 211—40 |
| 3,100,671 | 8/1963 | Atkins | 312—14 |

FOREIGN PATENTS

| | | |
|---|---|---|
| 793,859 | 12/1935 | France. |
| 757,032 | 8/1956 | Great Britain. |

CLAUDE A. LE ROY, *Primary Examiner.*

W. D. LOULAN, *Assistant Examiner.*